(12) United States Patent
Green, III et al.

(10) Patent No.: US 11,863,285 B2
(45) Date of Patent: Jan. 2, 2024

(54) MAXIMUM DIVERSITY SCHEME FOR IMPROVING COVERAGE AREA AND DIVERSITY PERFORMANCE OF A MEDIA SYSTEM

(71) Applicant: AUDIO-TECHNICA U.S., INC., Stow, OH (US)

(72) Inventors: Robert T. Green, III, Streetsboro, OH (US); Brian K. Fair, Boyds, MD (US); Jacquelynn A. Green, Streetsboro, OH (US)

(73) Assignee: AUDIO-TECHNICA U.S., INC., Stow, OH (US)

( * ) Notice: Subject to any disclaimer, the term of this patent is extended or adjusted under 35 U.S.C. 154(b) by 0 days.

(21) Appl. No.: 17/612,535

(22) PCT Filed: May 19, 2020

(86) PCT No.: PCT/US2020/033614
§ 371 (c)(1),
(2) Date: Nov. 18, 2021

(87) PCT Pub. No.: WO2020/236824
PCT Pub. Date: Nov. 26, 2020

(65) Prior Publication Data
US 2023/0095188 A1    Mar. 30, 2023

Related U.S. Application Data

(60) Provisional application No. 62/851,032, filed on May 21, 2019.

(51) Int. Cl.
*H04B 7/12*        (2006.01)
(52) U.S. Cl.
CPC ..................... *H04B 7/12* (2013.01)

(58) Field of Classification Search
CPC ....................................................... H04B 7/12
See application file for complete search history.

(56) References Cited

U.S. PATENT DOCUMENTS

| | | | |
|---|---|---|---|
| 4,885,747 A | 12/1989 | Foglia | |
| 5,550,872 A * | 8/1996 | Liberti, Jr. | ........... H04B 7/0857 375/267 |

(Continued)

FOREIGN PATENT DOCUMENTS

| | | |
|---|---|---|
| CN | 114041322 A | 2/2022 |
| EP | 3973743 | 3/2022 |

(Continued)

OTHER PUBLICATIONS

International Search Report and Written Opinion dated Jul. 30, 2020 for International Application No. PCT/US2020/33614 from International Searching Authority—US, pp. 1-9, United States.

(Continued)

*Primary Examiner* — Curtis B Odom
(74) *Attorney, Agent, or Firm* — SHERMAN IP LLP; Kenneth L. Sherman; Hemavathy Perumal

(57) ABSTRACT

One embodiment provides a method providing a maximum diversity scheme for improving coverage area and diversity performance of a media system. The method comprises, at an antenna module of the media system, wirelessly receiving, via a receiver antenna of the antenna module, broadband radio frequency (RF) signals from a transmitter of the media system, instantaneously converting, via a converter circuitry of the antenna module, the broadband RF signals into one or more digital baseband components, generating, via a processor unit of the antenna module, a single digital data stream by applying diversity processing to the digital base- (Continued)

band components, and outputting the single digital data stream over a network cable to another device of the media system.

20 Claims, 5 Drawing Sheets

(56) References Cited

U.S. PATENT DOCUMENTS

| | | | |
|---|---|---|---|
| 8,005,152 | B2 | 8/2011 | Wegener |
| 8,355,715 | B2 | 1/2013 | Rybicki et al. |
| 9,065,699 | B2 | 6/2015 | Stratigos, Jr. |
| 9,584,193 | B2 | 2/2017 | Stratigos, Jr. |
| 2008/0304590 | A1 | 12/2008 | Sundberg et al. |
| 2016/0285521 | A1* | 9/2016 | Lange .................. H04B 7/022 |
| 2018/0241441 | A1 | 8/2018 | Carlsson et al. |

FOREIGN PATENT DOCUMENTS

| | | |
|---|---|---|
| JP | 2007-295579 A | 11/2007 |
| JP | 2010-529781 A | 8/2010 |
| JP | 2011-526095 A | 9/2011 |
| JP | 2016-506122 A | 2/2016 |
| WO | 2001056297 A1 | 8/2001 |

OTHER PUBLICATIONS

International Preliminary Report on Patentability dated Dec. 2, 2021 for International Application PCT/US2018/051018 from U.S. Receiving Office, pp. 1-7, United States.

Yajima, T., et al., "Real-time picture wireless transfer from high speed mobile," Papers of Technical Meetings of The Institute of Electrical Engineers of Japan CMN-17-72, Japan, Nov. 24, 2017, pp. 83-86 [English—Language Abstract Included].

Japanese Office Action dated Dec. 20, 2022 for Japanese Patent Application No. 2021-568835, from the Japanese Patent Office, pp. 1-9, Japan [English-language translation included].

Canadian Examiner's Requisition dated Dec. 28, 2022 for Canadian Patent Application 3,141,317 from the Canadian Intellectual Property Office, pp. 1-3, Canada.

Extended European Search Report dated Jun. 15, 2023 for EP Application No. 20809504.2, from the European Patent Office, pp. 1-9, Munich, DE.

Japanese Final Office Action dated Jul. 11, 2023 for Japanese Patent Application No. 2021-568835, from the Japanese Patent Office, pp. 1-4, Japan [English—language translation included].

* cited by examiner

MAXIMUM DIVERSITY SCHEME FOR IMPROVING COVERAGE AREA AND DIVERSITY PERFORMANCE OF A MEDIA SYSTEM

CROSS REFERENCE TO RELATED APPLICATIONS

This application claims priority from U.S. Provisional Patent Application Ser. No. 62/851,032, filed on May 21, 2019, incorporated herein by reference.

TECHNICAL FIELD

One or more embodiments relate generally to media systems, and in particular, a system and method providing a maximum diversity scheme for improving coverage area and diversity performance of a media system.

BACKGROUND

A media system is configured to receive one or more audio and/or video data streams from one or more sources, process the data streams, and distribute one or more resulting processed data streams to one or more devices (e.g., display devices, recording devices, speaker devices, storage devices, etc.) for audio reproduction, video display, recording and/or storage. Typically, each transceiver of a conventional media system is limited/restricted to wirelessly receiving data streams from up to twenty-four (24) transmitters maximum.

SUMMARY

One embodiment provides a method providing a maximum diversity scheme for improving coverage area and diversity performance of a media system. The method comprises, at an antenna module of the media system, wirelessly receiving, via a receiver antenna of the antenna module, broadband radio frequency (RF) signals from a transmitter of the media system, instantaneously converting, via a converter circuitry of the antenna module, the broadband RF signals into one or more digital baseband components, generating, via a processor unit of the antenna module, a single digital data stream by applying diversity processing to the digital baseband components, and outputting the single digital data stream over a network cable to another device of the media system.

Another embodiment provides a media system providing a maximum diversity scheme for improving coverage area and diversity performance of the media system. The media system comprises a master processing device, at least one transmitter, and at least one antenna module. Each antenna module is configured to wirelessly receive, via a receiver antenna of the antenna module, broadband RF signals from the at least one transmitter, instantaneously convert, via a converter circuitry of the antenna module, the broadband RF signals into one or more digital baseband components, generate, via a processor unit of the antenna module, a single digital data stream by applying diversity processing to the digital baseband components, and output the single digital data stream over a network cable to the master processing device.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
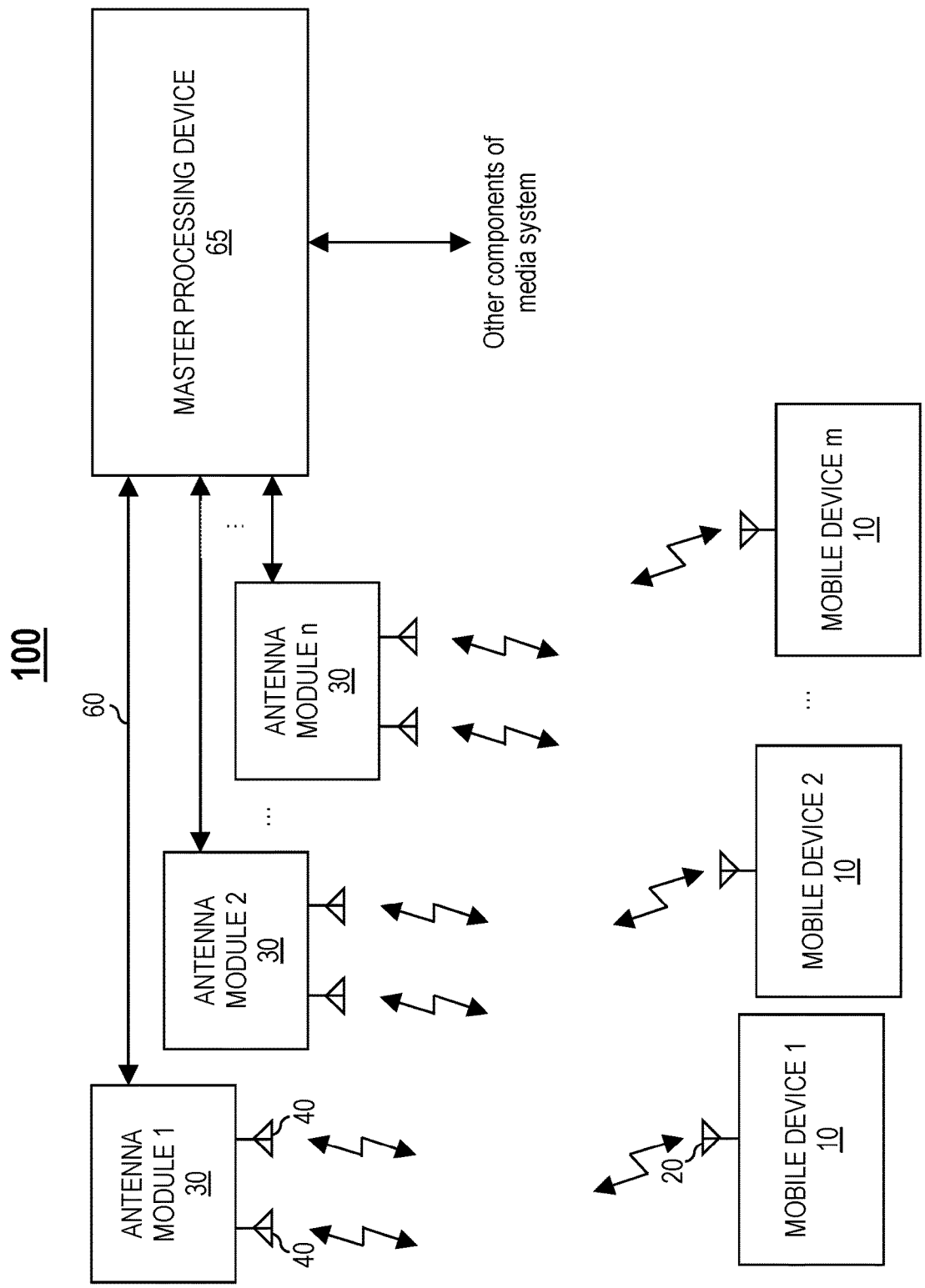
FIG. 1 illustrates an example professional media system, in accordance with one embodiment.

The detailed description explains the preferred embodiments of the invention together with advantages and features, by way of example with reference to the drawings.

DETAILED DESCRIPTION

One or more embodiments relate generally to media systems, and in particular, a system and method providing a maximum diversity scheme for improving coverage area and diversity performance of a media system. One embodiment provides a method providing a maximum diversity scheme for improving coverage area and diversity performance of a media system. The method comprises, at an antenna module of the media system, wirelessly receiving, via a receiver antenna of the antenna module, broadband radio frequency (RF) signals from a transmitter of the media system, instantaneously converting, via a converter circuitry of the antenna module, the broadband RF signals into one or more digital baseband components, generating, via a processor unit of the antenna module, a single digital data stream by applying diversity processing to the digital baseband components, and outputting the single digital data stream over a network cable to another device of the media system.

Another embodiment provides a media system providing a maximum diversity scheme for improving coverage area and diversity performance of the media system. The media system comprises a master processing device, at least one transmitter, and at least one antenna module. Each antenna module is configured to wirelessly receive, via a receiver antenna of the antenna module, broadband RF signals from the at least one transmitter, instantaneously convert, via a converter circuitry of the antenna module, the broadband RF signals into one or more digital baseband components, generate, via a processor unit of the antenna module, a single digital data stream by applying diversity processing to the digital baseband components, and output the single digital data stream over a network cable to the master processing device.

Examples of media systems include, but are not limited to, wireless systems such as wireless microphone systems, public address (PA) systems, broadcasting systems such as audio broadcasting systems, audiovisual (AV) systems, and other types of professional audio systems or professional video systems operated by broadcasters (e.g., a radio broadcaster, a TV broadcaster, etc.), festivals, fairs, film studios, conventions, corporate events, houses of worship, sports leagues, schools, recording studios (i.e., facilities for sound recording, mixing, and audio production), facilities for audio post production, programming networks, theaters, venues (e.g., sports venues, music venues, etc.), etc.

For expository purposes, the term "media device" as used herein generally refers to a media device utilized in a media system. Examples of different media devices include, but are not limited to the following: a laptop computer, a smart phone, a tablet, a wearable device (e.g., a smart watch), any other type of mobile electronic device; a desktop computer; a smart appliance (e.g., a smart speaker, a smart television); an Internet of Things (IoT) device; professional audio equipment such as a microcontroller unit (MCU), a transceiver, a transmitter, a microphone, a wireless microphone, an amplifier, an audio mixer, a recording device, any other type of professional audio equipment; professional audio systems such as wireless microphone systems, broadcast systems, public address systems, and other professional audio systems.

The present invention concerns a media system and a method of providing maximum antenna diversity for improving coverage area and diversity performance of a media system.

FIG. 1 illustrates an example professional media system 100, in accordance with one embodiment. The system 100 comprises one or more wireless mobile devices 10 (e.g., MOBILE DEVICE 1, . . . , MOBILE DEVICE m). In one embodiment, each mobile device 10 is a media device capable of exchanging data with another device wirelessly. Examples of mobile devices 10 include, but are not limited to, wireless microphones such as hand-held or body-worn wireless microphones, in-ear monitors, media devices used for cueing on-air talent, intercom systems for backstage communications, etc.

Each mobile device 10 has a corresponding transmitter 20. A transmitter 20 corresponding to a mobile device 10 is either integrated in the mobile device 10 itself or is a separate piece of equipment (e.g., a bodypack transmitter) connected/coupled to the mobile device 10. A transmitter 20 corresponding to a mobile device 10 is configured to wirelessly transmit a data stream captured by the mobile device 10 (e.g., wirelessly transmit audio signals, video signals, etc.), and wirelessly receive signals (e.g., sync pulses, time synchronization information, control commands comprising instructions for adjusting one or more parameters/settings for the mobile device 10, such as an operating mode). In one embodiment, a data stream wirelessly transmitted by a transmitter 20 of the media system comprises RF signals. For example, in one embodiment, the data stream comprises broadband RF signals.

In one embodiment, each mobile device 10 and corresponding transmitter 20 is associated with a particular application/use. For example, assume the system 100 is a wireless microphone system utilized/operated at an event (e.g., a concert, an awards ceremony, a sports event, etc.), where at least one mobile device 10 of the system 100 is a wireless microphone and at least one transmitter 20 of the system 100 is a microphone transmitter unit (MTU) corresponding to the wireless microphone. One MTU 20 of the system 100 is for an on-air talent/performer at the event (e.g., a vocalist, a play-by-play commentator), and another MTU 20 of the system 100 is for a different on-air talent/performer at the same event (e.g., a guitarist, a color commentator).

In one embodiment, a mobile device 10 and/or a transmitter 20 is a digital wireless media device 10 that utilizes digital wireless technology for transmission. In another embodiment, a mobile device 10 and/or a transmitter 20 is an analog wireless media device that utilizes traditional analog wireless technology for transmission (e.g., transmitting analog audio via RF with frequency modulation (FM)).

The system 100 further comprises one or more antenna modules (i.e., components, devices, or nodes) 30 (e.g., ANTENNA MODULE 1, . . . , ANTENNA MODULE n). Each antenna module 30 of the system 100 comprises two or more receiver antennas 40. Each receiver antenna 40 is configured to wirelessly receive at least one data stream from at least one transmitter 20 of the system 100.

In one embodiment, each receiver antenna 40 comprises a single antenna for wirelessly receiving a data stream comprising RF signals from a transmitter 20 of the system 100. In another embodiment, each receiver antenna 40 comprises a plurality of antennas (e.g., a diversity of antennas, such as a flexible printed circuit board (PCB) comprising a planar array of microstrip antenna elements) for wirelessly receiving at least one data stream comprising RF signals from at least one transmitter 20 of the system 100.

In one embodiment, at least one antenna module 30 of the system 100 optionally comprises one or more transmitter antennas (not shown). Each transmitter antenna is configured to wirelessly transmit signals (e.g., sync pulses) to a transmitter 20 of the system 100 to coordinate timing and synchronization of data streams the transmitter antenna receives from the transmitter 20.

In one embodiment, at least one antenna module 30 of the system 100 operates as a transceiver (i.e., an antenna/transceiver node that transmits signals and receives data streams).

In another embodiment, at least one antenna module 30 of the system 100 operates as a receiver only (i.e., an antenna/receiver node that receives data streams only). For example, at least one antenna module 30 of the system 100 does not have any transmitter antennas. As another example, each transmitter antenna included in at least one antenna module 30 of the system 100 is disabled.

In one embodiment, each antenna module 30 comprises, for each receiver antenna 40 of the antenna module 30, a corresponding independent converter circuitry 45 (FIG. 2) configured to instantaneously/immediately convert broadband RF signals received via the receiver antenna 40 into one or more a digital baseband components. In one embodiment, the broadband RF signals have a band designation of high-frequency (HF). In one embodiment, the broadband RF signals comprise independent/individual narrowband signals.

In one embodiment, each antenna module 30 comprises at least one processor unit 46 (FIG. 2) configured to: (1) receive digital baseband components from a converter circuitry 45 of the antenna module 30 that is co-located with the processor unit 46 (i.e., located within proximity of the converter circuitry 45), and (2) perform diversity processing on the digital baseband components to generate/produce a single digital data stream. Broadband RF signals received via a receiver antenna 40 are immediately converted (via a corresponding converter circuitry 45) to baseband signals and processed (via a co-located processor unit 46) before it is transported to other components of the system 100 for additional processing and output.

In one embodiment, the system 100 comprises a master processing device 65. For each antenna module 30 of the system 100, the antenna module 30 has a direct connection (i.e., wired back) to the master processing device 65 via a network cable 60. Each antenna module 30 of the system 100 has a wired interface for communicating with the master processing device 65. In one embodiment, the wired interface is an Ethernet network interface card. In another embodiment, the wired interface is a fiber optic network interface card. Each antenna module 30 of the system 100 is configured to transmit, via its wired interface, a digital data stream generated by a processor unit 46 of the antenna module 30 to the master processing device 65 over a digital cable connection provided by a network cable 60. The master processing device 65 is configured to interface with at least one antenna module 30 of the system 100, process at least one digital data stream received from the at least one antenna module 30, and output and interface with one or more other components of the system 100 for additional processing and output, such as a media processing device 90 (FIG. 3), a media output device 95 (FIG. 3), etc. A media processing device 90 is a media device configured for processing (e.g., audio mixing, etc.). A media output device 95 is a media device configured for output (e.g., displaying video, reproducing audio, etc.).

Examples of a network cable 60 include, but are limited to, an Ethernet cable (e.g., Cat 5 cable), a fiber optic cable, or any other standard cable used for data transfer.

As the antenna modules 30 locally convert RF signals received via its receiver antennas 40 into narrowband baseband signals and locally process the baseband signals into digital data, the system 100 allows for all RF processing to take place at the antenna modules 30 itself, such that only digital data streams need to be transmitted to other components of the system 100 (e.g., the master processing device 65, a media processing device 90, media output device 95, etc.).

A conventional media system permits operation of up to thirty-two (32) receivers/transceivers maximum and twenty-four (24) transmitters maximum. Typically, each receiver or transceiver of a conventional media system is limited/restricted to wirelessly receiving data streams from up to 24 transmitters maximum. By comparison, in one embodiment, the system 100 provides a maximum wireless diversity scheme in which an unlimited number of receiver antennas 40 and/or antenna modules 30 can be geographically distributed in an application space (e.g., a venue) without resulting in negative effects such as, but not limited to, antenna phase interactions, cable loss, RF interference, intermodulation or combining, etc. The system 100 enables any number of receiver antennas 40 to be placed/positioned throughout, or deployed/distributed in, an application space, thereby improving/increasing coverage area and diversity performance without encountering negative effects or without any requirement to coordinate/distribute RF signals. This is unlike conventional media systems where careful consideration must be given to frequency coordination, use of accessory antennas and distribution boxes, connection of custom or expensive filters, building and running of expensive cables, allocation of space and power to large racks of receivers, antenna distribution gear, and breakouts for digital output devices (such as MADI or Dante) if interfacing with a network/protocol system. In one embodiment, as the system 100 allows for any number of receiver antennas 40 and/or antenna modules 30 in an application space, the system 100 facilitates a large number of audio channels (e.g., 128 audio channels) to be processed efficiently via the single system 100, thereby allowing maximum signal robustness. The ability to add more receiver antennas 40 improves diversity performance of the system 100 without requiring any changes in the design of other components of the system 100 (e.g., the master processing device 65, a media processing device 90, media output device 95, etc.).

In one embodiment, a receiver antenna 40 and/or an antenna module 30 is flexibly configured without requiring any changes to other components of the system 100 (e.g., the master processing device 65, a media processing device 90, media output device etc.). For example, the system 100 allows adjustments to a receiver antenna 40/antenna module 30, such as adjusting a frequency that the receiver antenna 40/antenna module 30 is configured to operate at and/or adjusting filtering of broadband RF signals, without requiring adjustments to other components of the system 10. A receiver antenna 40/antenna module 30 can be individually configured without affecting the other components of the system 100, thereby enabling the system 100 to be arranged/constructed in a modular fashion and eliminating the need to maintain racks of equipment including traditional RF receivers. Further, a receiver antenna 40/antenna module 30 can be flexibly configured to a job-specific or application-specific configuration necessary/required to execute a specific job or application (e.g., a particular audio project).

Therefore an object of the present invention is to provide an improved media system. In particular, the invention seeks to provide a media system which allows for any number of receiver antennas that are flexibly configured, thereby providing a maximum wireless diversity scheme for improving coverage area and diversity performance of the media system.

Figure 2:
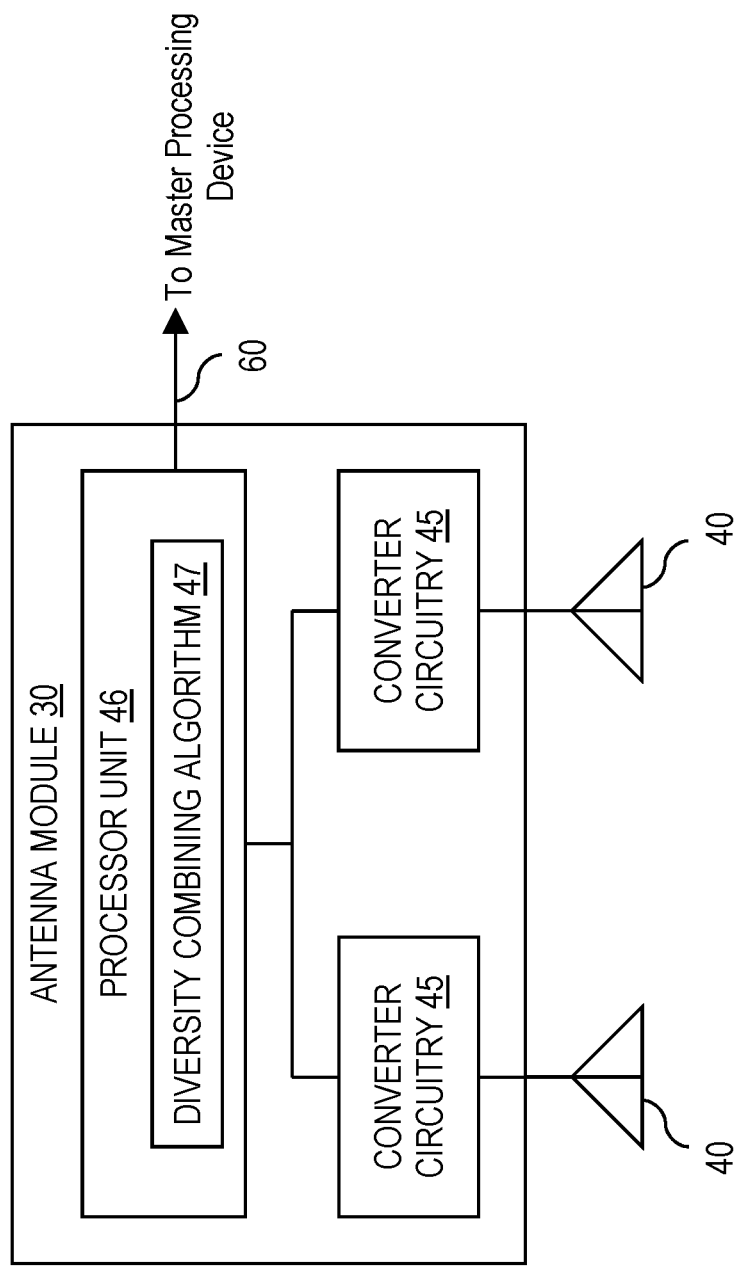
FIG. 2 illustrates an example antenna module, in accordance with one embodiment.

FIG. 2 illustrates an example antenna module 30, in accordance with one embodiment. As shown in FIG. 2, in one embodiment, each receiver antenna 40 of the antenna module 30 is immediately followed by, or immediately connected to, a corresponding independent converter circuitry (i.e., circuit) 45. Each receiver antenna 40 of the antenna module 30 has its own separate converter circuitry 45 that is not shared with any other receiver antenna 40. Each independent converter circuitry 45 is configured to: (1) instantaneously/immediately convert broadband RF signals received via a corresponding receiver antenna 40 into one or more digital baseband components (e.g., in-phase and quadrature components), and (2) provide the digital baseband components to a processor unit 46 of the antenna module 30 that is co-located with the converter circuitry 45. In one embodiment, the broadband RF signals have a band designation of HF and comprise independent/individual narrowband signals.

In one embodiment, a receiver antenna 40 of an antenna module 30 is configured to filter and/or amplify broadband RF received from a transmitter 20 of the media system 100, and immediately provide resulting filtered and/or amplified broadband RF signals to a corresponding converter circuitry 45 which directly converts the broadband RF signals into one or more digital baseband components.

In one embodiment, each processor unit 46 of the antenna module 30 is configured to: (1) receive digital baseband components from a converter circuitry 45 of the antenna module 30 that is co-located with the processor unit 46, (2) deconstruct the digital baseband components into a plurality of independent/individual narrowband baseband signals, (3) generate/produce a single digital data stream by applying a diversity combining algorithm 47 to the narrowband baseband signals to combine the narrowband baseband signals into the single digital data stream, and (4) output, via a wired interface of the antenna module 30, the digital data stream to the master processing device 65 over a network cable 60 connected to the antenna module 30. The processor unit 46 locally performs initial diversity processing of the narrowband baseband signals (i.e., locally combines the narrowband baseband signals) to achieve full diversity performance. In one embodiment, the processor unit 46 is configured to divide baseband signals into a plurality of bands, and convert the baseband signals into narrowband baseband signals for each band. In one embodiment, the processor unit 46 is configured to generate a single digital data stream for each of the narrowband baseband signals, and output, via the wired interface, the single digital data stream without demodulation.

Examples of a diversity combining algorithm 47 include, but are not limited to, equal-gain combining, maximal-ratio combining, switched combining, selection combining, etc.

Figure 3:
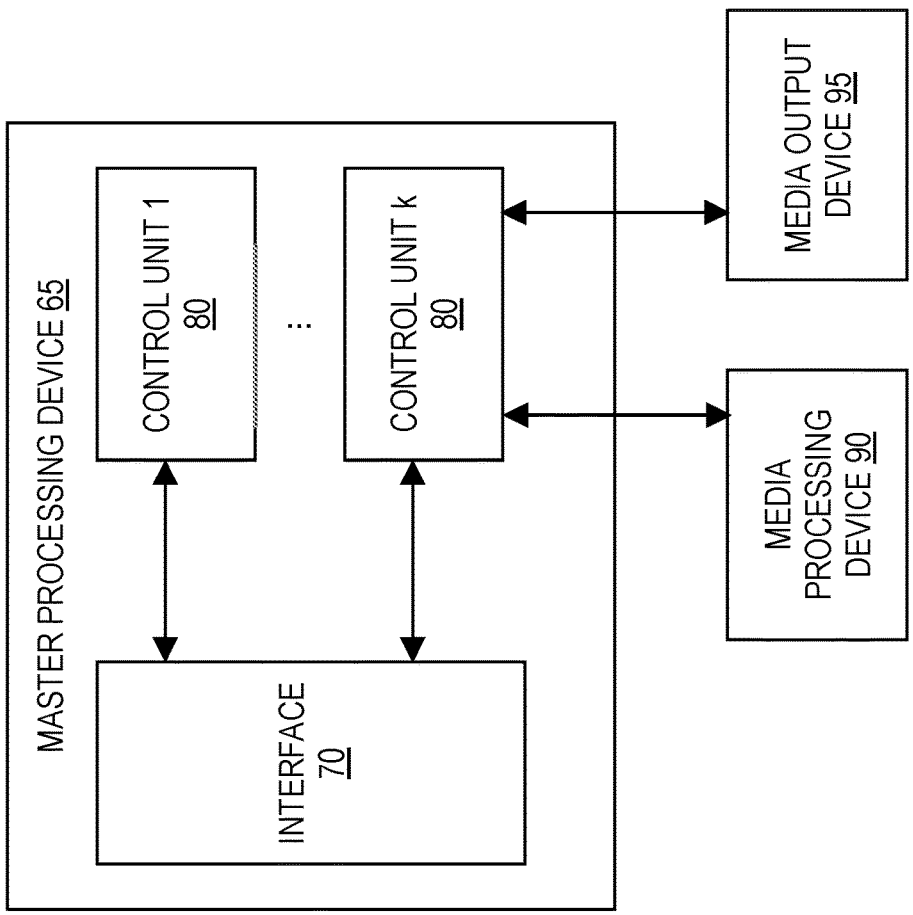
FIG. 3 illustrates an example master processing device, in accordance with one embodiment.

FIG. 3 illustrates an example master processing device 65, in accordance with one embodiment. In one embodiment, the master processing device 65 comprises a modular wired interface 70. Each antenna module 30 of the system 100 has a direct connection (i.e., wired back) to the interface 70 via a network cable 60. For example, in one embodiment, the interface 70 provides an optical interface (e.g., a fiber optic network interface card) capable of receiving digital data streams from the antenna modules 30 of the system 100 via fiber optic cables that directly connect the antenna modules 30 to the interface 70.

In one embodiment, the master processing device 65 comprises one or more control units (CUs) 80 (e.g., CONTROL UNIT 1, . . . , CONTROL UNIT k). The interface 70 is configured to exchange data (e.g., over a network cable, such as a Cat 5 cable) with each CU 80. Each CU 80 is in turn connected to any number of components for additional processing and output. For example, in one embodiment, each CU 80 exchanges data with one or more media processing devices 90 (e.g., audio processing devices, such as audio decoders) and/or one or more media output devices 95 (e.g., audio output devices, such as intercoms or speakers in a venue's IP-based media system) for additional diversity processing (e.g., applying another diversity combining algorithm) and then full demodulation into actual transmitted media (e.g., audio, video) and (signal) data. In one embodiment, the master processing device 65 operates as a master controller unit for the system 100. In one embodiment, each CU 80 is configured to enhance performance of the system 100 by combining multiple digital data streams from multiple antenna modules 30.

Figure 4:
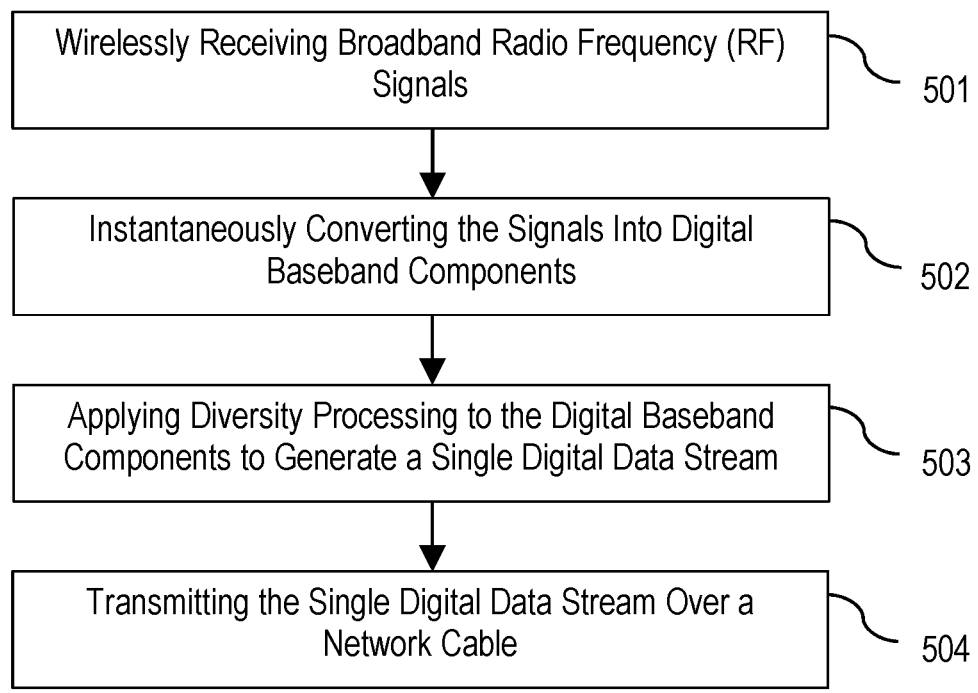
FIG. 4 illustrates a flowchart of an example process for implementing a maximum diversity scheme for improving coverage area and diversity performance of a media system, in accordance with one embodiment.

FIG. 4 illustrates a flowchart of an example process 500 for implementing a maximum diversity scheme for improving coverage area and diversity performance of a media system, in accordance with one embodiment. Process block 501 includes wirelessly receiving broadband RF signals. Process block 502 instantaneously converting the broadband RF signals into digital baseband components. Process block 503 includes applying diversity processing to the digital baseband components to generate a single digital data stream. Process block 504 includes transmitting the single digital data stream over a network cable.

In one embodiment, process blocks 501-504 may be performed utilizing one or more components of the media system 100, such as the antenna module 30.

Figure 5:
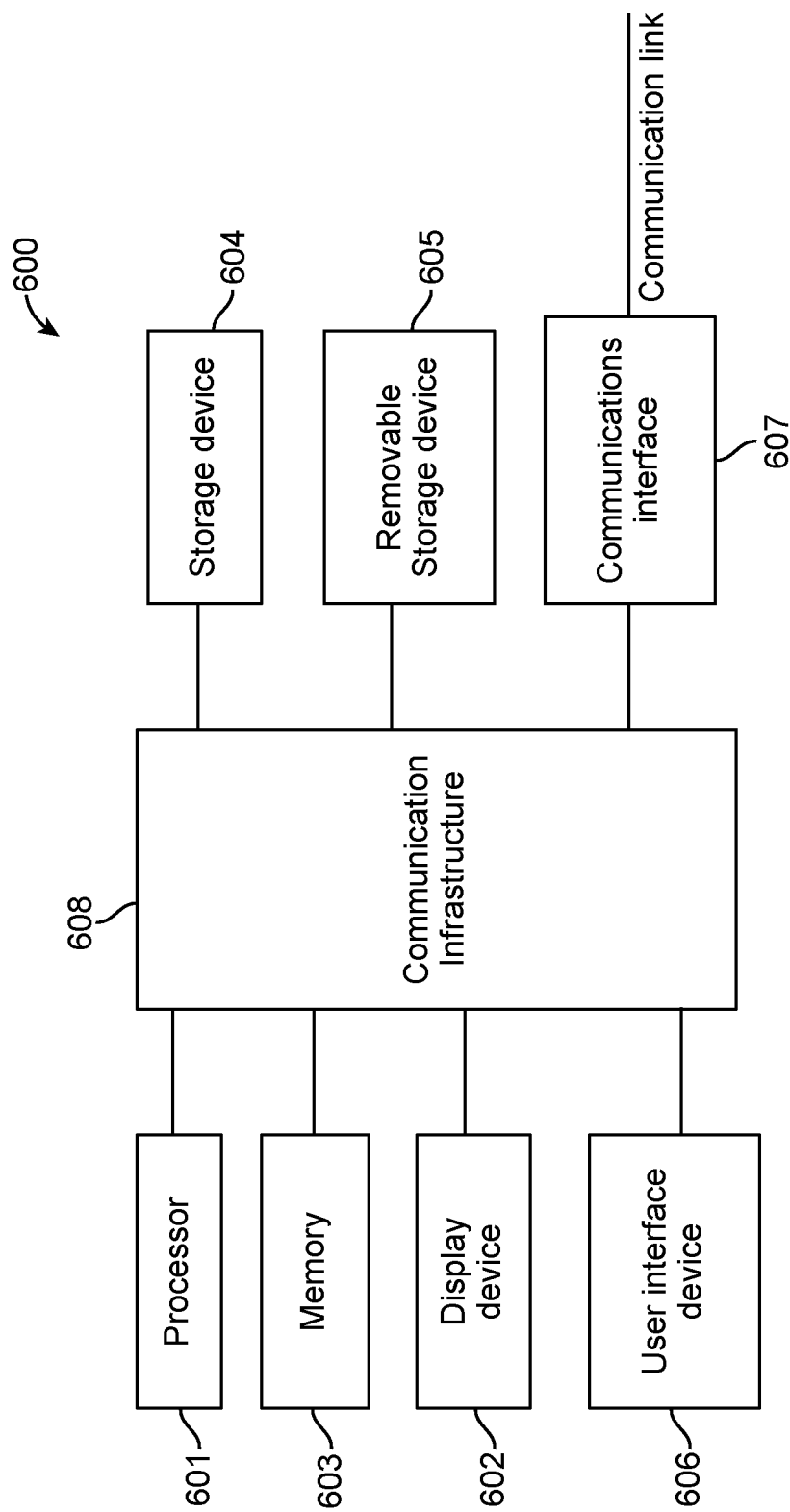
FIG. 5 is a high-level block diagram showing an information processing system comprising a computer system useful for implementing the disclosed embodiments.

FIG. 5 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 500.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 500 (FIG. 4) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method providing a maximum diversity scheme for improving coverage area and diversity performance of a media system, comprising:
  at an antenna module of the media system:
    wirelessly receiving, via a receiver antenna of the antenna module, broadband radio frequency (RF) signals from a transmitter of the media system;
    instantaneously converting, via a converter circuitry of the antenna module, the broadband RF signals into one or more digital baseband components;
    deconstructing, via a processor unit of the antenna module, the digital baseband components by:
      dividing the digital baseband components into a plurality of bands; and
      for each band of the plurality of bands, converting the digital baseband components into a corresponding group of narrowband baseband signals for the band; and
    for each band of the plurality of bands:
      generating, via the same processor unit of the antenna module, a corresponding single digital data stream for the band by applying diversity processing to a corresponding group of narrowband baseband signals for the band to combine the corresponding group of narrowband baseband signals for the band into the corresponding single digital data stream for the band; and
      outputting, via a wired interface of the antenna module, the corresponding single digital data stream for the band over a network cable to a device of the media system, wherein the corresponding single digital data stream for the band is outputted from the antenna module without demodulation;
    wherein each receiver antenna of the antenna module utilizes the same processor unit for the deconstructing, the generating, and the outputting.

2. The method of claim 1, wherein the antenna module is directly connected to the device via the network cable.

3. The method of claim 1, wherein the broadband RF signals have a band designation of high-frequency (HF).

4. The method of claim 1, wherein the broadband RF signals comprise a plurality of individual narrowband baseband signals.

5. The method of claim 4, wherein the applying comprises:
  for each band of the plurality of bands:
    applying a diversity combining algorithm to a corresponding group of narrowband baseband signals for the band to combine the corresponding group of narrowband baseband signals for the band into a corresponding single digital data stream for the band.

6. The method of claim 1, wherein each receiver antenna of the antenna module has a corresponding converter circuitry that is not shared with any other receiver antenna of the antenna module.

7. The method of claim 1, wherein the antenna module comprises two or more receiver antennas.

8. The method of claim 1, wherein the processor unit is co-located with the converter circuitry.

9. The method of claim 1, wherein the network cable is one of an Ethernet cable or a fiber optic cable.

10. The method of claim 1, wherein the device is configured to:
  for each band of the plurality of bands, process a corresponding single digital data stream for the band; and
  output and interface with one or more other devices of the media system.

11. A media system providing a maximum diversity scheme for improving coverage area and diversity performance of the media system, comprising:
  a master processing device;
  at least one transmitter; and
  at least one antenna module, wherein each antenna module is configured to:
    wirelessly receive, via a receiver antenna of the antenna module, broadband radio frequency (RF) signals from the at least one transmitter;
    instantaneously convert, via a converter circuitry of the antenna module, the broadband RF signals into one or more digital baseband components;
    deconstruct, via a processor unit of the antenna module, the digital baseband components by:
      dividing the digital baseband components into a plurality of bands; and
      for each band of the plurality of bands, converting the digital baseband components into a corresponding group of narrowband baseband signals for the band; and
    for each band of the plurality of bands:
      generate, via the same processor unit of the antenna module, a corresponding single digital data stream by applying diversity processing to a corresponding group of narrowband baseband signals for the band to combine the corresponding group of narrowband baseband signals for the band into the corresponding single digital data stream for the band; and
      output, via a wired interface of the antenna module, the corresponding single digital data stream for the band over a network cable to the master processing device, wherein the corresponding single digital data stream for the band is outputted from the antenna module without demodulation;
    wherein each receiver antenna of the antenna module utilizes the same processor unit for the deconstructing, the generating, and the outputting.

12. The media system of claim 11, wherein each antenna module is directly connected to the master processing device via a network cable.

13. The media system of claim 11, wherein the broadband RF signals have a band designation of high-frequency (HF).

14. The media system of claim 11, wherein the broadband RF signals comprise a plurality of individual narrowband baseband signals.

15. The media system of claim 14, wherein the applying comprises:
  for each band of the plurality of bands:
    applying a diversity combining algorithm to a corresponding group of narrowband baseband signals for the band to combine the corresponding group of narrowband baseband signals for the band into a corresponding single digital data stream for the band.

16. The media system of claim 11, wherein each receiver antenna of each antenna module has a corresponding converter circuitry that is not shared with any other receiver antenna of the antenna module.

17. The media system of claim 11, wherein each antenna module comprises two or more receiver antennas.

18. The media system of claim 11, wherein the processor unit is co-located with the converter circuitry.

19. The media system of claim 11, wherein the network cable is one of an Ethernet cable or a fiber optic cable.

20. The media system of claim 11, wherein the master processing device is configured to:
 for each band of the plurality of bands, process a corresponding single digital data stream for the band; and
 output and interface with one or more other devices of the media system.

\* \* \* \* \*